US010807076B2

(12) United States Patent
Sigman et al.

(10) Patent No.: US 10,807,076 B2
(45) Date of Patent: *Oct. 20, 2020

(54) MESOPOROUS FCC CATALYSTS WITH EXCELLENT ATTRITION RESISTANCE

(71) Applicant: BASF Corporation, Florham Park, NJ (US)

(72) Inventors: Michael Sigman, Bainbridge, GA (US); Charles Keweshan, Phillipsburg, NJ (US); Mitchell Willis, Bainbridge, GA (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,896

(22) Filed: Dec. 3, 2018

(65) Prior Publication Data

US 2019/0099746 A1    Apr. 4, 2019

Related U.S. Application Data

(62) Division of application No. 14/515,161, filed on Oct. 15, 2014, now abandoned.

(Continued)

(51) Int. Cl.
*B01J 29/08* (2006.01)
*B01J 37/00* (2006.01)
(Continued)

(52) U.S. Cl.
CPC .......... *B01J 29/084* (2013.01); *B01J 35/023* (2013.01); *B01J 35/1019* (2013.01);
(Continued)

(58) Field of Classification Search
CPC ........ B01J 27/14; B01J 35/10; B01J 35/1019; B01J 35/1038; B01J 35/1061;
(Continued)

(56) References Cited

U.S. PATENT DOCUMENTS 3,663,461 A    5/1972 Witt
4,174,279 A    11/1979 Clark et al.
(Continued)

FOREIGN PATENT DOCUMENTS

CN    1727445    2/2006
CN    1020192200    4/2011
(Continued)

OTHER PUBLICATIONS

EP Search Report for EP Patent Application No. EP14853295.5 dated Sep. 30, 2016, 10 pages.

*Primary Examiner* — Jun Li
(74) *Attorney, Agent, or Firm* — Lowenstein Sandler LLP (57) ABSTRACT

This application discloses a mesoporous catalyst formed by combining a matrix precursor treated with a polyphosphate, and a metallic oxide treated with a cationic electrolyte. The combined treatment with the polyphosphate and cationic polyelectrolyte yields unexpected improvements in attrition resistance, while maintaining high overall pore volume, even as the ratio of meso pore volume to macro pore volume of the formed FCC catalyst increases.

10 Claims, 4 Drawing Sheets

Related U.S. Application Data (60) Provisional application No. 61/891,046, filed on Oct. 15, 2013.

(51) Int. Cl.
   *B01J 35/02* (2006.01)
   *B01J 35/10* (2006.01)
   *C10G 11/05* (2006.01)

(52) U.S. Cl.
   CPC ....... *B01J 35/1038* (2013.01); *B01J 35/1061* (2013.01); *B01J 37/0018* (2013.01); *B01J 37/0045* (2013.01); *C10G 11/05* (2013.01); *B01J 2229/36* (2013.01); *B01J 2229/42* (2013.01); *B01J 2229/64* (2013.01)

(58) Field of Classification Search
   CPC .. B01J 37/0018; B01J 37/084; B01J 2229/36; B01J 2229/42; B01J 2229/64; C10G 11/05; C04B 33/04
   See application file for complete search history.

(56) References Cited

U.S. PATENT DOCUMENTS

| | | | |
|---|---|---|---|
| 4,493,902 A | 1/1985 | Brown et al. | |
| 4,631,262 A | 12/1986 | Altomare | |
| 4,767,466 A | 8/1988 | Nemeh et al. | |
| 5,395,809 A | 3/1995 | Madon et al. | |
| 5,866,496 A | 2/1999 | Albers et al. | |
| 6,908,603 B2 | 6/2005 | Xu et al. | |
| 6,943,132 B2 | 9/2005 | Stockwell et al. | |
| 8,940,156 B2* | 1/2015 | Folmar | B01J 21/005 208/113 |
| 9,175,230 B2 | 11/2015 | Long et al. | |
| 9,403,161 B2 | 8/2016 | Sigman et al. | |
| 9,682,366 B2* | 6/2017 | Sigman | C01B 39/24 |
| 2003/0199386 A1 | 10/2003 | Stockwell et al. | |
| 2004/0238407 A1 | 12/2004 | Xu et al. | |
| 2006/0293176 A1 | 12/2006 | Chang et al. | |
| 2007/0209969 A1 | 9/2007 | Shen et al. | |
| 2008/0293561 A1 | 11/2008 | Long et al. | |
| 2011/0108462 A1 | 5/2011 | Chang | |
| 2012/0227629 A1 | 9/2012 | Folmar et al. | |
| 2012/0228194 A1 | 9/2012 | Folmar et al. | |
| 2013/0085311 A1* | 4/2013 | Youn | C10G 51/04 585/651 |
| 2013/0098804 A1 | 4/2013 | Chang et al. | |
| 2013/0183231 A1* | 7/2013 | Senderov | B01J 29/18 423/701 |
| 2014/0371053 A1* | 12/2014 | Sigman | B01J 35/1019 502/9 |

FOREIGN PATENT DOCUMENTS

| | | |
|---|---|---|
| JP | 2004130193 | 4/2004 |
| RU | 2473385 | 1/2013 |
| WO | 2005123252 | 12/2005 |

* cited by examiner

MESOPOROUS FCC CATALYSTS WITH EXCELLENT ATTRITION RESISTANCE

CROSS-REFERENCE TO RELATED APPLICATIONS

This application is a divisional application of U.S. patent application Ser. No. 14/515,161, filed on Oct. 15, 2014, which claims the benefit of priority of U.S. Provisional Patent Application No. 61/891,046, filed on Oct. 15, 2013, the disclosure of which are hereby incorporated by reference herein in their entireties.

BACKGROUND OF THE INVENTION

The present invention relates to novel fluid catalytic cracking catalysts comprising microspheres containing Y-faujasite zeolite and having exceptionally high activity and other desirable characteristics, methods for making such catalysts and the use of such catalysts for cracking petroleum feedstocks, particularly under short residence time processes.

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows: "The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Generally, FCC is commercially practiced in a cyclic mode. During these operations, the hydrocarbon feedstock is contacted with hot, active, solid particulate catalyst without added hydrogen, for example, at pressures of up to about 50 psig and temperatures up to about 650° C. The catalyst is a powder with particle sizes of about 20-200 microns in diameter and with an average size of approximately 60-100 microns. The powder is propelled upwardly through a riser reaction zone, fluidized and thoroughly mixed with the hydrocarbon feed. The hydrocarbon feed is cracked at the aforementioned high temperatures by the catalyst and separated into various hydrocarbon products. As the hydrocarbon feed is cracked in the presence of cracking catalyst to form gasoline and olefins, undesirable carbonaceous residue known as "coke" is deposited on the catalyst.

The spent catalyst contains coke as well as metals that are present in the feedstock. Catalysts for FCC are typically large pore aluminosilicate compositions, including faujasite or zeolite Y.

The coked catalyst particles are separated from the cracked hydrocarbon products, and after stripping, are transferred into a regenerator where the coke is burned off to regenerate the catalyst. The regenerated catalyst then flows downwardly from the regenerator to the base of the riser.

These cycles of cracking and regeneration at high flow rates and temperatures have a tendency to physically break down the catalyst into even smaller particles called "fines". These fines have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled by controlling the initial spray drying of the catalyst, if the attrition resistance is poor, the catalytic cracking unit may produce a large amount of the 0-20 micron fines which should not be released into the atmosphere. Commercial catalytic cracking units include cyclones and electrostatic precipitators to prevent fines from becoming airborne. Those skilled in the art also appreciate that excessive generation of catalyst fines increases the cost of catalyst to the refiner. Excess fines can cause increased addition of catalyst and dilution of catalytically viable particles.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to affect its conversion into metakaolin, this resulting in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60% by weight metakaolin and about 40-70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

The activity and selectivity characteristics of the catalysts formed by the process of the '902 patent are achieved even though, in general, the catalysts have relatively low total porosity as compared to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35-20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely affect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time ("SCT") often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized, that under the short contact time processing of hydrocarbons, further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

In commonly assigned U.S. Pat. No. 6,943,132, it has been found that if the non-zeolite, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced.

The ultrafine hydrous kaolin is dried in a spray dryer, or suitable unit operation, then deagglomerated using high energy pulverizers, or dry milling procedures. This unit operation is practiced to reduce agglomerates and return calciner feed to a particle size similar to what was measured in a slurry as noted above. The presence of agglomerated structures alter the particle size and bulk density properties of the calcined kaolin. During phase change from hydrous kaolin, agglomeration and sintering occurs. The measured particle size coarsens throughout the particle size ranges. Large agglomerated structures have higher density thus lower porosity. Structuring prior to calcination expands the pore volume by cementing particle contact points, which in fully calcined kaolins are theoretically maintained by expelled amorphous silica. The thermal transition to spinel expels one mol of silica per mol of spinel formed. Mullite transition from spinel expels four additional mols.

More generally, the FCC catalyst matrix useful to achieve FCC catalyst macroporosity is derived from alumina sources, such as kaolin calcined through the exotherm, that have a specified water pore volume, which distinguishes over prior art calcined kaolin used to form the catalyst matrix. The water pore volume is derived from an Incipient Slurry Point ("ISP") test, which is described in the patent.

The morphology of the microsphere catalysts which are formed according to U.S. Pat. No. 6,943,132 is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined therein means the catalyst has a macropore volume in the pore range of 600-20,000 Å of at least 0.07 cc/gm mercury intrusion. The catalysts also have a BET surface area less than 500 m²/g. The novel catalyst is optimal for FCC processing, including the short contact time processing in which the hydrocarbon feed is contacted with a catalyst is for times of about 3 seconds or less.

High porosity within the microsphere is important to maximize catalytic activity by eliminating typical rate reductions due to diffusion of the crude oil molecules within the microsphere structure. As the porosity of a microsphere is increased, however, the rate at which the microsphere fractures and attrits into finer particles within the FCC unit operating environment increases; resulting in increased fresh catalyst addition rates and increased particulate emission from the unit. Processing or compositional mechanisms for reducing the rate at which an FCC catalyst attrits for a given total pore volume is of fundamental importance to improving the performance and corresponding value of the catalyst.

As disclosed in co-pending, commonly assigned U.S. Ser. No. 13/042,808, filed Mar. 8, 2011, it has been found that metallic oxides such as kaolin, which have been used as matrix materials for FCC catalysts, when treated with small amounts of polyphosphate and then heated, are unexpectedly provided with internal structuring so as to increase the internal porosity of the oxide. Metallic oxides which can change crystalline phases upon heating when so treated, can maintain internal pore volume during the phase change, even as the hardness of the metallic oxide increases during heat treatment.

Ammonium polyphosphate (APP) treatment of precursor matrix powders provides improved internal structure, yielding high pore volume finished FCC catalysts, useful, in particular, in VGO cracking. Pore volume in the micro (20-30 angstroms) range is known to yield increased coke. Meso pores (30-100 angstroms) are known to produce improved coke selectivity and macro pores (100-10,000 angstroms) allow diffusion enabling short contact reaction times. The pore sizes above represent classification of the micro, meso and macro pore sizes in accordance with the present invention. The APP treated product has fewer micro pores and enhanced meso and macro pore volume. At a given pore volume, an APP treated matrix precursor generates marginally better attrition than a comparable high pore volume catalyst, as described in U.S. Pat. No. 6,943,132. Thus, larger pore volume products can be generated with similar attrition properties.

In co-pending, commonly assigned U.S. Ser. No. 13/919,225, filed Jun. 17, 2013, it is disclosed that treating hydrous kaolin with cationic polyelectrolytes, prior to processing into a microsphere substrate for subsequent zeolite growth, yields FCC catalysts with improved attrition resistance, even while good pore volume within the catalyst structure is maintained.

SUMMARY OF THE INVENTION

Improved attrition resistance, as well as controlled pore volume is now provided to an FCC catalyst from a microsphere formed by combining a matrix precursor treated with a polyphosphate and a hydrous kaolin slurry treated with a cationic polyelectrolyte. The combined treatment with the polyphosphate and cationic polyelectrolyte yields unexpected improvements in attrition resistance, while maintaining high overall pore volume, even as the ratio of meso pore volume to macro pore volume of the formed FCC catalyst increases.

DETAILED DESCRIPTION OF THE INVENTION

The catalyst microspheres of this invention are produced by the general process as disclosed in commonly assigned U.S. Pat. No. 4,493,902. It is preferred, although not required, that the non-zeolitic, alumina-rich matrix of the catalysts of the present invention be derived from a hydrous kaolin source that is in the form of an ultrafine powder in which at least 90 wt. % of the particles are less than 2.0 microns, preferably at least 70 wt. % less than 1 micron as disclosed in aforementioned U.S. Pat. No. 6,943,132. The ultrafine hydrous kaolin is pulverized and calcined through the exotherm. It is also within the scope of this invention that the zeolite microspheres be formed with an alumina-rich matrix derived from kaolin having a larger size, and which is calcined at least substantially through its characteristic exotherm. Satintone® No. 1, (a commercially available kaolin that has been calcined through its characteristic exotherm without any substantial formation of mullite) is a material used on a commercial basis to form the alumina-rich matrix. Satintone® No. 1 is derived from a hydrous kaolin in which 70% of the particles are less than 2 microns. Other sources used to form the alumina-rich matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet clay has found the most widespread commercial use and has met tremendous success worldwide.

The general procedure for manufacturing the FCC microspheres of this invention is well-known in the art and can be followed from the procedure disclosed in U.S. Pat. No. 4,493,902. As disclosed therein, an aqueous slurry of reactive finely divided hydrous kaolin and/or metakaolin and alumina-containing material, which forms the matrix such as the ultrafine kaolin that has been calcined through its characteristic exotherm, is prepared. The aqueous slurry is then spray dried to obtain microspheres comprising a mixture of hydrous kaolin and/or metakaolin and kaolin that has been calcined at least substantially through its characteristic exotherm to form the high-alumina matrix. Preferably, a moderate amount of sodium silicate is added to the aqueous slurry before it is spray dried to function as a binder between the kaolin particles.

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT R pigment. Purified water-processed kaolin clays from Middle Georgia have been used with success. Calcined products of these hydrous kaolins can be used as the metakaolin component of the feed slurry.

The novel microspheres demonstrating reduced rates of attrition are generally produced from a blend of hydrous kaolin particles and calcined kaolin particles. The composition of the blend is typically 25 parts to 75 parts hydrous kaolin and 75 to 25 parts calcined kaolin. Hydrous kaolin particles are approximately 0.20 to 10 microns in diameter as measured by Sedigraph that have been slurried in water in a solids range of 30 to 80 wt %, as limited by process viscosity with an appropriate dispersant addition. Preferably, 90 wt % or more of the particles are less than 2 microns in size. The calcined kaolin consists of kaolinite that has been heated past its exothermic crystalline phase transformation to form spinel (what some authorities refer to as a defect aluminum-silicon spinel or a gamma alumina phase) or mullite.

Silicate for the binder is preferably provided by sodium silicates with $SiO_2$ to $Na_2O$ ratios of from 1.5 to 3.5, and especially preferred ratios of from 2.88 to 3.22.

The binder is then added at a level of 0 to 20 wt % (when measured as $SiO_2$) prior to spray drying the slurry to form ceramic porous beads that average in particle size from 20 to 200 um. The spray dried beads are then heated beyond the kaolinite endothermic transition that initiates at 550° C. to form metakaolin. The resulting microspheres are then crystallized, base exchanged, calcined, and typically, but not always based exchanged and calcined a second time.

A quantity (e.g., 1 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product, or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres may be calcined directly, or alternatively acid washed to further enhance ion exchange of the catalysts after crystallization. The acid washing process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subsequently filtered and washed free from the microspheres. The silica gel-bound microspheres are then calcined. In either case, calcination is done at a temperature and for a time (e.g., for two hours in a muffle furnace at a chamber temperature of about 1,350° F.) sufficient to convert any hydrated kaolin component of the microspheres to meta kaolin, leaving the previously calcined kaolin components of the microspheres essentially unchanged. The resulting calcined porous microspheres comprise a mixture of metakaolin and kaolin clay calcined through its characteristic exotherm in which the two types of calcined kaolin are present in the same microspheres. Alternatively, any appropriate calcined alumina can replace the kaolin calcined through the exotherm as previously described.

Y-faujasite is allowed to crystallize by mixing the calcined kaolin microspheres with the appropriate amounts of other constituents (including at least sodium silicate and water), as discussed in U.S. Pat. No. 4,493,902, and then heating the resulting slurry to a temperature and for a time (e.g., to 200°-215° F. for 10-24 hours) sufficient to crystallize Y-faujasite in the microspheres. The prescriptions of U.S. Pat. No. 4,493,902 may be followed as written.

After the crystallization process is terminated, the microspheres containing Y-faujasite are separated from at least a substantial portion of their mother liquor, e.g., by filtration. It may be desirable to wash to microspheres by contacting them with water either during or after the filtration step. Retained silica is controlled in the synthesis product to different levels. The silica forms a silica gel that imparts functionality for specific finished product applications. The microspheres that are filtered contain Y-faujasite zeolite in the sodium form. Typically, the microspheres contain more than about 8% by weight $Na_2O$. To prepare the microspheres as active catalysts, a substantial portion of the sodium ions in the microspheres are replaced by ammonium or rare earth ions, or both.

Ion exchange may be conducted by a number of different ion exchange methods. Preferably, the microspheres are first exchanged one or more times with an ammonium salt such as ammonium nitrate or sulfate solution at a pH of about 3. A typical design base exchange process would have multiple filter belts which process the product countercurrent to exchange solution flow. The number of equilibrium stages is determined by the total sodium to be removed and optimization of chemical cost. A typical process contains 3 to 6 equilibrium stages in each base exchange process. The ion exchange(s) with ammonium ions are preferably followed by one or more ion exchanges with rare earth ions at a pH of about 3. The rare earth may be provided as a single rare earth material or as a mixture of rare earth materials. Preferably, the rare earth is provided in the form on nitrates or chlorides. The preferred microspheres of the invention are ion exchanged to contain between 0% and 12% by weight REO, most preferably 1% to 5% by weight REO and less than about 0.5, more preferably as low as 0.1% by weight $Na_2O$. As is well known, an intermediate calcination will be required to reach these soda levels.

After ion exchange is completed, the microspheres are dried. Many dryer designs can be used including drum, flash, and spray drying. The procedure described above for ion exchanging the FCC microsphere catalysts of this invention is well-known and, as such, such process, per se, does not form the basis of this invention.

The present invention is directed to improving the pore volume and attrition resistance of the zeolite-containing FCC catalyst formed by the process described above. To this end, a hydrous kaolin slurry used in providing the reactive nutrient for zeolite formation is treated with a cationic polyelectrolyte and a second metal oxide, e.g., a calcined kaolin powder, used in providing the catalyst matrix, is treated with a polyphosphate prior to processing into a microsphere substrate. The cationic polyelectrolyte addition decreases the attrition rate of the resulting FCC catalyst as measured by air jet (ASTM method D5757-00) and Roller attrition tests relative to control catalyst samples generated without the polyelectrolyte addition at the same total catalyst pore volume. The exact mechanism resulting in the improved attrition is under investigation, but polyelectrolytes are known and utilized in paper coating and filling applications requiring the flocculation of hydrous, calcined and mixtures of hydrous and calcined kaolin particles. The addition of polyelectrolyte to the hydrous kaolin slurry blend is believed to impart localized structure through the formation of fine aggregates that is maintained through the spray drying and calcination steps of the microsphere formation process.

Although structuring of the hydrous kaolin is attributed to the corresponding improvement in catalyst attrition, the polyelectrolyte, such as a polyamine, may be added at any point during the microsphere precursor formulation process. The order of addition of the polyelectrolyte is not limited to a specific point during the formation of the microsphere precursor slurry. For example, the polyelectrolyte could be added to the hydrous slurry prior to blending calcined kaolin or it could be added following the blending of the hydrous and calcined slurries. The specific process description relates to the use of the polyelectrolyte with hydrous and calcined kaolin slurries used to form microspheres, but is not limited to those materials. Other metal oxide precursors may be used in the microsphere formulation as either a matrix component or as a zeolite nutrient. These components may require incorporation of an alternative polyelectrolyte with differing MW and cationic charge than those selected specifically for formulations containing hydrous and/or calcined kaolin alone in order to achieve the desired structure within the spray dried microsphere. Non-limiting examples include alumina, hydrated alumina, aluminum hydroxide, silica and alumina-silica materials such as clays.

The amount of the cationic polyelectrolyte added to the kaolin slurry is minimal and, yet, substantial improvement in attrition resistance has been found in the finished catalyst. Thus, amounts of about 0.1 to 5 lbs or 0.005 to 0.25 wt. % of polyelectrolyte per ton of dry kaolin (uncalcined and calcined) have been found to yield the desired results. More preferably, 0.5 to 2 lbs per ton, or 0.025 to 0.1 wt. %, polyelectrolyte to the total kaolin content on a dry basis is effectively added. Increased dosages of polyelectrolyte greater than 5 lbs of electrolyte per ton of clay may be possible, but only with a corresponding decrease in solids level to enable subsequent processing and spray drying. It should be understood that the percentage of polyelectrolyte used is based on all kaolin solids present in the slurry used to form the microsphere, prior to zeolite crystallization.

The cationic polyelectrolytes useful in this invention are known in the art as bulking agents to flocculate hydrous kaolin in paper filling and coating applications. Many such agents are also known as flocculants to increase the rate at which clay slurries filter. See, for example, U.S. Pat. Nos. 4,174,279 and 4,767,466. Useful cationic polyelectrolyte flocculants include polyamines, quaternary ammonium salts, diallyl ammonium polymer salts, dimethyl dially ammonium chloride (polydadmacs). Cationic polyelectrolyte flocculants are characterized by a high density of positive charge, as determined by dividing the total number positive charges per molecule by the molecular weight (MW). The MW of the chemistries are estimated to be between 10,000 and 1,000,000 (e.g. between 50,000 and 250,000) with positive charge densities generally exceeding $1 \times 10^{-3}$. Such materials do not contain anionic groups such as carboxyl or carbonyl groups. Positive charge centers near the end of the polymer chain react and bridge with anionic sites such as exposed alumina sites along the platelet edge of neighboring hydrous particles until the accessible clay charge centers or the polymer charge centers are exhausted. The bridging strengthens the bond between the particles, thereby providing a highly shear resistant, bulked clay mineral composition. The presence of chloride ions in the filtrate in the case of dimethyldiallyl ammonium chloride may be an indication that at least one stage of the reaction between clay particles and quaternary salt polymer occurs by an ion-exchange mechanism.

The Kemira Superfloc C-500 series polyamines are liquid, cationic polymers of differing molecular weights. They work effectively as primary coagulants and charge neutralization agents in liquid-solid separation processes in a wide variety of industries. The chemistry range available ensures there is a product suitable for each individual application. Many, if not all of the above products have branched polymer chains. MAGNAFLOC LT7989, LT7990 and LT7991 from BASF are also polyamines contained in about 50% solution and useful in this invention.

In addition to the alkyldiallyl quaternary ammonium salts, other quaternary ammonium cationic flocculants are obtained by copolymerizing aliphatic secondary amines with epichlorohydrin. Still other water-soluble cationic polyelectrolytes are poly (quaternary ammonium) polyether salts that contain quaternary nitrogen in the polymeric backbone and are chain extended by ether groups. They are prepared from water-soluble poly (quaternary ammonium salts) containing pendant hydroxyl groups and bifunctionally reactive chain extending agents; such polyelectrolytes are prepared by treating an $N,N,N^{(1)},N^{(1)}$ tetraalkylhydroxyalkylenediamine and an organic dihalide such as dihydroalkane or a dihaloether with an epoxy haloalkane. Such polyelectrolytes and their use in flocculating clay are disclosed in U.S. Pat. No. 3,663,461.

Further to this invention, metal oxides such as kaolin, which form the matrix of the FCC catalyst, are reacted with a structuring agent in the form of a polyphosphate, whether as a solid polyphosphate salt or liquid polyphosphate such as ammonium polyphosphate prior to forming the microspheres as in accordance with the teachings of U.S. Pat. No. 4,493,902 described above. There does not appear to be any criticality in the length of the polyphosphate chain and, accordingly, di-polyphosphates, tri-polyphosphates, and higher polyphosphate chains to a thousand or more are useful in this invention. Mixtures of polyphosphate and orthophosphates such as phosphoric acid are possible, as long as the amount of the orthophosphoric acid component is not excessive. Preferably, the orthophosphoric acid content should not be greater than 50 wt. % of any structuring mixture with one or more polyphosphates. The amount of orthophosphate or orthophosphoric acid is to be minimized inasmuch as many, if not all, of the anionically dispersed metallic oxide matrices will flocculate in the presence of phosphoric acid, and not provide the structuring effect found. Flocculation also greatly hinders the processing of these materials. A particularly preferred class of structuring agents is the ammonium polyphosphates, which are often soluble in water and are liquid so as to be easily processed with aqueous slurries of the metallic oxides to be treated. Of particular usefulness is a liquid ammonium phosphate, for example, liquid fertilizer such as 11-37-0 and 10-34-0 and the like, which has an available phosphate content of about 33% to 37%, an orthophosphate content of about 27% and a polyphosphate content of about 65-75%. This material is 100% water soluble.

The amount of polyphosphate structuring agent added to the metallic oxide matrix precursors such as hydrous kaolin to be treated to provide internal structuring, is minimal. Thus, amounts of polyphosphate added relative to metallic oxide (kaolin) solids can range from as little as 0.01 to 5 wt. %. More specifically, amounts of polyphosphate will range from about 0.05 to 2 wt. % and, more particular still, from about 0.05 to 0.5 wt. %. It has been found that even these small amounts of polyphosphate can provide significant changes in surface area and internal pore volume of the metallic oxide treated relative to untreated materials. In general, the process of treating the metallic oxide to add internal structuring thereto includes slurrying the oxide in water and mixing the polyphosphate structuring agent in liquid form with the aqueous metallic oxide slurry. Slurry dispersant can be included such as sodium hydroxide, sodium carbonate, sodium polyacrylate, sodium silicate, tetra-sodium pyrophosphate, sodium metasilicate, sodium hexametaphosphate, and/or sodium tri-polyphosphate. As noted above, certain polyphosphates such as ammonium polyphosphate are in liquid form and can be simply added to the slurry. Other polyphosphate salts may need to be dissolved in a solvent. Inasmuch as the mixture is spray dried under vacuum or heating and a further heating step is usually required to provide structuring, the solvent, while preferably being water, can be an organic solvent which will vaporize either during the spray drying process and be completely removed during any subsequent heating process.

Spray drying the slurry mixture yields particulate mixtures of the metallic oxide and polyphosphate structuring agent. Moisture content is reduced below 5.0 wt. %, typically, below 2.0 wt. %. Subsequent to spray drying, a pulverization step to crush the spray dried particles can be useful in providing a uniform mixture of the metallic oxide and structuring agent. Subsequent heating results in the reaction of the polyphosphate with the metallic oxide and the formation of new internal structure within the oxide, providing additional pore volume and a higher surface area. Further heating to consolidate the material results in additional hardness and with the new added pore volume, the surface area of the treated oxide is not as drastically reduced, as in untreated materials. It is to be understood that while spray drying is preferably used to form a mixture of the metallic oxide to be treated and the polyphosphate structuring agent, other mixing techniques can be used, as is well known in the mixing art. Other drying techniques can be used, for example, spray granulator, ultrasonic atomization, Lamrot atomizer, etc.

The cationic polyelectrolyte and the polyphosphate may be added to separate metal oxide slurries or in the case of the polyelectrolyte to the blended hydrous and calcined slurry. The slurries may then be dried using variously available processing methods, such as by spray drying, to form the microsphere that can then be treated to initiate zeolite growth. The cationic electrolyte-treated slurry forms the nutrient base for zeolite growth; while the polyphosphate treated slurry is the matrix of the produced FCC catalyst.

Method of Production

The process of this invention can now be more specifically described for the treatment of separate batches of hydrous kaolin to be used to form the microsphere, which is used for zeolite crystallization. It is to be understood that the process, while essentially similar for all other types of metallic oxides to be treated, may have certain details which differ from the treatment of kaolin. Hydrous kaolin particles approximately 0.20 to 10 microns in diameter are slurried in separate batches with water in a solid range of 30 to 80 wt.

%, as limited by process viscosity. More typically, the slurry will comprise 40-70% by weight hydrous kaolin solids and, still further, 50 to 65% by weight kaolin solids in water. Room temperature slurries can be prepared, although the slurry can be heated up to 150° F., if desired, prior to entering the spray dryer. Mixed with one of the aqueous kaolin slurries is a polyphosphate, for example, a liquid ammonium polyphosphate, for example, fertilizer grade ammonium polyphosphate such as 11-37-0, 10-34-0 and the likes. Approximately, 0.01 to 5 wt. % of the ammonium polyphosphate as available phosphate content can be mixed with the aqueous kaolin slurry relative to the kaolin solids. Preferably, the amount of polyphosphate structuring agent would be in the lower portion of the stated range, typically from about 0.01 to 0.2 wt. % as available phosphate content and, more preferably, about 0.15 wt. % as available phosphate content, relative to the kaolin solids. The mixture of the aqueous hydrous kaolin slurry and liquid ammonium polyphosphate is spray dried in conventional spray drying equipment. Spray drying can be done in a vacuum or at atmospheric pressure at temperatures between about 70° F. to 550° F. to remove the water.

The size of the spray dried particles comprising the mixture of metallic oxides such as hydrous kaolin, alumina, etc., or mixtures thereof with ammonium polyphosphate will generally range from about 20 to 200 microns. Prior to heating the spray dried particle mixture to induce the structuring reactions, it may be useful to pulverize the spray dried particles into a powder to provide a more uniform mixture of the ammonium polyphosphate and metallic oxide. The mixture can then be heated in air in any calcining furnace. As the temperature is raised, the ammonium polyphosphate decomposes at or above 350° F. The decomposition products are predominately polyphosphoric and orthophosphoric acid. As heating continues, the metallic oxide will be converted to a different crystalline form. For example, with respect to kaolin, the hydrous kaolin is converted to metakaolin at which time the alumina in the kaolin lattice becomes chemically active. Phosphate materials react with the aluminum sites in the kaolin to form new structuring within the kaolin particle. It is believed that the incremental structure within the kaolin particle is likely created, due to the polyphosphoric acid reacting with the chemically active aluminum present, forming aluminum/phosphate bridges, while the products are in the metakaolin phase.

The low temperature decomposition of polyphosphates affords a structuring reaction to take place when kaolin transitions into the metakaolin phase. There are unexpected benefits to a process that effectively extends the art of kaolin calcination. The first benefit is the creation of incremental surface area and pore volume in the kaolin lattice. This degree of structuring can be controlled making the lattice more absorbent. Second, the polyphosphate reaction driving structuring is at low temperature, well below the threshold temperature where metakaolin undergoes lattice reconfiguration to spinel and mullite. The newly created structure can serve as a sink to collect the silica expelled as metakaolin transitions to spinel and mullite with incremental heat treatment. This advantage significantly enhances the control capability of the calcination process and can leverage the use of fluxes (i.e. sodium silicate, sodium borate or the likes) that lower the temperature at which the spinel and mullite transitions take place to produce unique lattice structures.

The kaolin is then heated to a temperature beyond the characteristic exotherm, i.e., 2000-2200° F., to form the spinel and mullite phases. Preferably, the calcination proceeds to about a 40% mullite content. The Mohs hardness of the calcined kaolin product can therefore be raised from the customary 4.5 range to 6.5, without agglomerate formation. Importantly, pore volume within the kaolin is not as drastically reduced relative to untreated kaolin that is converted to a significant mullite phase. The calcined product is pulverized again to make a powder and stored.

A separate hydrous clay slurry equivalent to that as immediately described above is treated with about 1 lb. polyamine/dry ton kaolin (dry) under modest mixing. If the Brookfield viscosity is high, the viscosity can be reduced with a polyacrylate dispersant of medium molecular weight. An alternative embodiment consists of treating the blended slurry containing both the hydrous clay and APP treated, calcined intermediate components.

The polyamine-treated slurry (70% to 30%, based on weight of kaolin solids, preferably 60 to 48%) is mixed with the APP powder (30% to 70%, preferably 40 to 52%) to form slurry. The combined slurry is spray dried while inline injected with 8 wt. % sodium silicate (3.22 modulus=$SiO_2$/$Na_2O$ as binder). The spray dried bead formed is directly injected to a calciner at a product temperature between 1400-1600° F. to convert hydrous kaolin to the reactive metakaolin. The calcination temperature controls the level of metakaolin formed. The metakaolin is the reactive agent for zeolite growth. The metakaolin content is targeted to yield the desired zeolite content, typically between 40 to 60 wt. %, based on the total weight of the microsphere.

After the candidate microsphere is prepared, it is placed into a crystallization reactor and slurried with sodium silicate solution, sodium hydroxide solution, a crystallization initiator (seeds) and a quantity of water. The amounts of the reactants are determined by a series of ratios of the reactive components expressed as $Si_2O/Na_2O$ (typically 2.0-3.0), $H_2O/Na_2O$ (typically 5.0-9.0), $SiO_2/Al_2O_3$ (typically 5.0-8.0) and a weight ratio of seeds to reactive alumina in the system (typically 0.002-0.003). The stirred mixture is then heated to 210° F. for a period of typically 10-20 hours until zeolite crystallization ceases as determined by a chemical test of the reactive solution indicating $Al_2O_3$ content <0.05%. Alternatively, X-ray diffraction ("XRD") testing of the solids to determine zeolite Y ("ZY") content in samples taken one hour apart from the reaction mixture shows no increase in the ZY content would indicate reaction completion. Fully crystallized Na—Y product is then separated by filtration from the liquid phase and washed to remove residual sodium silicate. The washed solids are then ion exchanged to remove sodium from the zeolite using a series of ion exchanges with an ammonium salt solution in combination with calcination to produce a nearly sodium free final product. Often, a level of Rare Earth is introduced during the ion exchange process (~1-5% as REO on the catalyst) to improve hydrothermal stability. Typical product characterization consists of surface area measurement by multipoint BET analysis, total chemical content by XRF, as well as pore volume analysis by high pressure Hg intrusion using a porosimeter instrument in order to determine total pore volume in cc/g and the pore size distribution versus pore radius. Catalytic testing may be done by cracking standard petroleum oil over the catalyst to determine activity and selectivity to petroleum products such as gasoline.

While the above description is directed to FCC catalysts containing zeolite formed in situ from a microsphere containing metakaolin, it is believed that improvements in attrition resistance can be achieved by this invention, in which the zeolite is incorporated into the matrix. In such instance, the cationic polyelectrolyte-treated hydrous kaolin can be mixed with the calcined kaolin formed from the polyphosphate treated kaolin but, any heating of the combined materials would be such as to not convert the hydrous kaolin to metakaolin. In such instance, the hydrous kaolin would now form part of the matrix. Zeolite crystals could be added to either or both of the hydrous kaolin slurry or calcined kaolin powder. A binder known in the art for incorporating zeolite into matrix materials can also be added. The inventive catalyst preferably has a meso/macro ratio of between 0.65 and 1.2, more preferably of between 0.675 and 1.1. The inventive catalyst preferably has an air jet attrition rate of at least 0.5 and less than 2.5, more preferably of at least 0.5 and less than 1.5.

Example 1

This example and corresponding data were produced and described in the commonly assigned U.S. application Ser. No. 13/042,790. The procedure and results are mentioned here for comparative purposes. Hydrous kaolin slurry consisting of particles with greater than 70% having an equivalent spherical diameter less than 2 μm as measured by Sedigraph 5200 and less than 0.5% particles captured on a 325-mesh screen was utilized. The hydrous kaolin in the amount of 37.5 dry wt. % was mixed with calcined kaolin in the amount of 62.5 dry wt. % to produce five inventive samples, each of which had a total slurry solids level of ~50% by weight. The physical properties of the kaolins are shown in Tables 1 and 2.

The incorporated calcined kaolin consisted of material that was heated beyond the characteristic exothermic transition at ~950° C. to form spinel, mullite or a combination of spinel and mullite. The Mullite index (MI) is the ratio of the mullite peak in the kaolin sample to a 100% mullite reference sample indicating the degree of heat treatment for the calcined kaolin as measured by XRD on a Panalytical Cubix Pro instrument. The apparent bulk density (ABD) is the weight per unit volume of the material including the void fraction. The tamped bulk density (TBD) is a measure of the bulk density following work input to encourage more efficient particle packing as measured with a TAP-PACK Volumeter (ISO 787-11).

TABLE 1

Physical properties of hydrous kaolin used in Inventive and Comparative sample preparations.

| Material | % +325 mesh residue | % <1 μm |
|---|---|---|
| Hydrous kaolin | <0.5% | 76 to 80 |

TABLE 2

Physical properties of calcined kaolin used in inventive and comparative sample preparations

| Material | MI | ABD (g/cc) | TBD (g/cc) | % +325 mesh residue | % <2 μm | % <1 μm |
|---|---|---|---|---|---|---|
| Calcined kaolin | 30 to 45 | 0 to 0.5 | 0.4 to 0.5 | 0 to 5 | 60 to 75 | 35 to 50 |

Superfloc C577 (cationic polyamine) was diluted to 1% solids in water and added to the inventive slurries at a dosage of 1.0 dry pound of polymer per ton of dry clay. A standard air powered mixer was used during the addition. Sodium silicate grade #40 (3.22 modulus or 3.22 parts $SiO_2$ per 1.0 parts of $Na_2O$) was then added as a binder to the mixture at a dosage of 4 wt. % on a $SiO_2$ basis. Alternatively, the amount of binder may vary from 0 wt. % to 20 wt. % on an $SiO_2$ basis addition of sodium silicate. The inventive slurry was then spray dried to form microspheres with an average particle size (APS) of 80 to 90 microns as measured by laser particle size analysis (Microtrac SRA 150). Other drying methods would be equally effective to reduce product moisture to below 2% by weight (as measured by OEM Labwave 9000 moisture analyzer). The resulting microspheres were calcined in a laboratory furnace at 815° C. (1500° F.) for 1 hour.

Five comparative samples were also produced from the same kaolin starting components as the inventive samples, using the same procedure except that the cationic polyamine was omitted and the sodium silicate binder concentration was increased in order to maintain microsphere integrity prior to crystallization (8 wt. % on $SiO_2$ basis to kaolin was added to the material). In the cases of Comparative samples IV and V, the ratio of hydrous to calcined kaolin utilized was changed to 40:60 respectively. Each of the inventive and comparative samples were generated with different amounts of nutrient metakaolin microspheres to create different microsphere total pore volume, in order to demonstrate the improvement in attrition observed with respect to varying total pore volume.

Following microsphere formation, zeolite crystallization was performed on the inventive samples and comparative samples as identified in Tables 3 and 4, wherein seeds were fine alumino-silicate particles used to initiate zeolite crystallization and growth. Sodium silicate with a composition of 21.6 wt % $SiO_2$ and 11.6 wt % $Na_2O$ (1.87 modulus as defined as parts $SiO_2$ to parts $Na_2O$) was recycled and generated from commercial production of microsphere. Nutrient microspheres, consisting primarily of metakaolin which are soluble in the basic crystallization environment, served as a nutrient source for continued zeolite Y growth. The seeds used to initiate zeolite crystallization are described in U.S. Pat. Nos. 4,493,902, and 4,631,262, which are incorporated herein by reference.

TABLE 3

FCC catalyst crystallization recipes for Inventive samples

| | Inventive I | Inventive II | Inventive III | Inventive IV | Inventive V |
|---|---|---|---|---|---|
| Polyamine Addition (lb/ton) | 1.0 | 1.0 | 1.0 | 1.0 | 1.0 |
| Seeds (g) | 75.0 | 75.0 | 75.0 | 75.0 | 75.0 |
| 1.87 modulus Sodium Silicate (g) | 826.5 | 870.7 | 915.2 | 959.9 | 1004.9 |
| 19% Caustic (g) | 92.5 | 84.5 | 76.4 | 68.4 | 60.3 |
| Water (g) | 135.7 | 138.1 | 140.5 | 143.0 | 145.5 |

TABLE 3-continued

FCC catalyst crystallization recipes for Inventive samples

|  | Inventive I | Inventive II | Inventive III | Inventive IV | Inventive V |
|---|---|---|---|---|---|
| Microspheres (g) | 230.6 | 225.7 | 220.9 | 216.0 | 211.1 |
| Nutrient Microspheres (g) | 19.4 | 24.3 | 29.1 | 34.0 | 38.9 |

TABLE 4

FCC catalyst crystallization recipes for Comparative samples

|  | Comparative I | Comparative II | Comparative III | Comparative IV | Comparative V |
|---|---|---|---|---|---|
| Polyamine Addition (lb/ton) | 0.0 | 0 | 0 | 0 | 0 |
| Seeds (g) | 75.0 | 75.0 | 75.0 | 75.0 | 75.0 |
| 1.87 modulus Sodium Silicate (g) | 697.0 | 835.3 | 785.5 | 1080.3 | 813.4 |
| 19% Caustic (g) | 96.4 | 73.3 | 79.3 | 25.4 | 85.9 |
| Water (g) | 150.0 | 147.7 | 154.3 | 170.3 | 154.6 |
| Microspheres (g) | 236.2 | 226.3 | 227.0 | 203.5 | 231.6 |
| Nutrient Microspheres (g) | 13.8 | 23.7 | 23.0 | 46.5 | 18.4 |

The Y-faujasite was allowed to crystallize by mixing the calcined kaolin microspheres with the appropriate amounts of other constituents (including at least sodium silicate and water), as disclosed in U.S. Pat. No. 5,395,809, the teachings of which are herein incorporated by reference, and then the resulting slurry was heated to a temperature of 200° to 215° F. for 10-24 hours, sufficient to crystallize Y-faujasite in the microspheres. The microspheres were crystallized to a desired zeolite content (typically ca. 50-65), filtered, washed, ammonium exchanged, exchanged with rare-earth cations, calcined, exchanged a second time with ammonium ions, and calcined for a second time. US Publication No. 2012/0228194 recites this procedure, and is incorporated herein by reference.

Table 5 and Table 6 list the physical properties of the resulting Inventive and Comparative samples following crystallization and the subsequent rounds of ion exchange and calcination. Total surface area (TSA), matrix surface area (MSA), and zeolite surface area (ZSA) were determined by BET analysis of nitrogen adsorption isotherms using a Micromeritics TriStar or TriStar 2 instrument. While the samples formed in this example yielded high activity/high surface area catalysts, the invention herein is not intended to be limited by the surface area or catalytic activity of the catalyst formed. This invention encompasses the improvement in attrition resistance regardless of the activity of the catalyst.

Following initial testing of the as produced catalysts, steaming was performed to simulate deactivated or equilibrium catalyst physical properties from a refinery. The process consists of steaming the catalyst at 1500° F. for 4 or more hours. Catalyst porosity was determined by the mercury porosimetry technique using a Micromeritics Autopore 4. Total pore volume is the cumulative volume of pores having diameters in the range of 35 to 20,000 Å.

TABLE 5

Catalyst physical properties for Inventive Samples

|  | Inventive I | Inventive II | Inventive III | Inventive IV | Inventive V |
|---|---|---|---|---|---|
| Total Surface Area ($m^2/g$) | 405 | 390 | 391 | 420 | 414 |
| Matrix Surface Area ($m^2/g$) | 104 | 103 | 101 | 109 | 111 |
| Zeolite Surface Area ($m^2/g$) | 301 | 287 | 290 | 311 | 303 |
| Zeolite to matrix surface area ratio | 2.89 | 2.79 | 2.87 | 2.85 | 2.73 |
| Steamed Total Surface Area ($m^2/g$) | 256 | 226 | 204 | 263 | 255 |
| Steamed Matrix Surface Area ($m^2/g$) | 71 | 77 | 73 | 88 | 82 |
| Steamed Zeolite Surface Area ($m^2/g$) | 185 | 149 | 131 | 175 | 173 |
| Steamed Zeolite to matrix surface area ratio | 2.61 | 1.94 | 1.79 | 1.99 | 2.11 |
| Total Pore Volume ($cm^3/g$) | 0.382 | 0.3904 | 0.375 | 0.364 | 0.353 |

TABLE 6

Catalyst physical properties for Comparative Samples

| | Comparative I | Comparative II | Comparative III | Comparative IV | Comparative V |
|---|---|---|---|---|---|
| Total Surface Area ($m^2/g$) | 393 | 421 | 444 | 422 | 404 |
| Matrix Surface Area ($m^2/g$) | 97 | 105 | 107 | 99 | 104 |
| Zeolite Surface Area ($m^2/g$) | 296 | 316 | 337 | 323 | 300 |
| Zeolite to matrix surface area ratio | 3.05 | 3.01 | 3.15 | 3.26 | 2.88 |
| Steamed Total Surface Area ($m^2/g$) | 259 | 277 | 285 | 279 | 280 |
| Steamed Matrix Surface Area ($m^2/g$) | 76 | 84 | 80 | 81 | 82 |
| Steamed Zeolite Surface Area ($m^2/g$) | 183 | 193 | 205 | 198 | 198 |
| Steamed Zeolite to matrix surface area ratio | 2.41 | 2.30 | 2.56 | 2.44 | 2.41 |
| Total Pore Volume ($cm^3/g$) | 0.359 | 0.382 | 0.370 | 0.383 | 0.405 |

Figure 1:
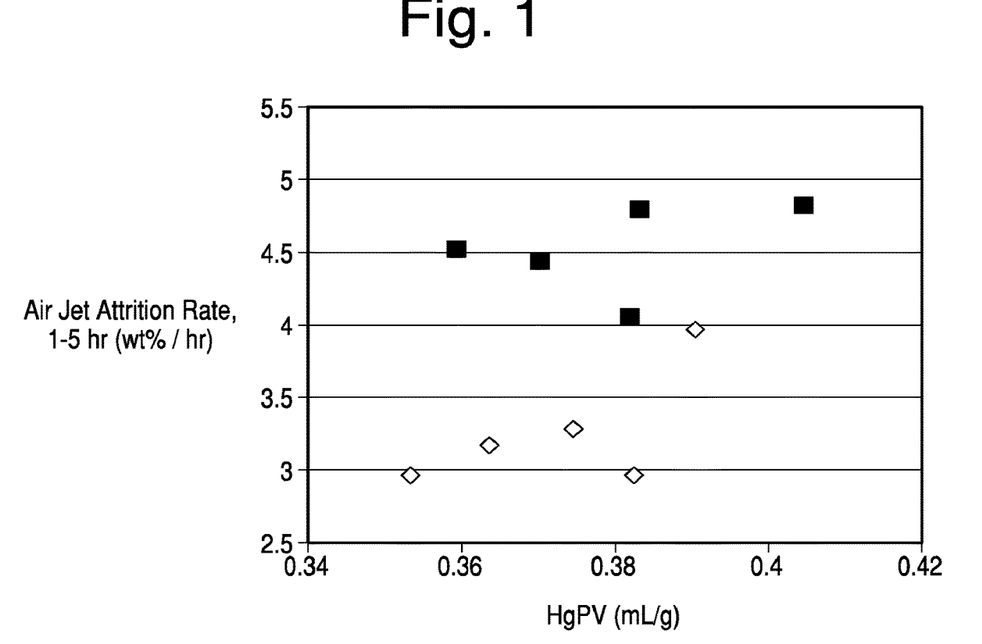
FIG. 1 is a graph of attrition resistance comparing a high pore volume commercial catalyst with one formed by the addition of polyamine.

Air jet attrition was measured for the inventive and comparative samples versus pore volume. Air jet attrition rate values were determined using an in-house unit following ASTM standard method D5757. Typically, for a given catalyst manufacturing method and composition, attrition rate rises as the porosity of the given catalyst particles increases. Addition of the polyelectrolyte flocculant prior to microsphere formation modifies the packing of the resulting particles prior to microsphere formation resulting in a ceramic structure that is more resistant to attrition. In particular, the resulting novel catalyst structure exhibits increased resistance to attrition resulting from an abrasion type failure mechanism (attrition of small particles relative to the total size of the original particle). FIG. 1 illustrates the reduction observed in attrition rate for the inventive samples (shown as diamonds) at equivalent or higher total pore volumes than the comparative samples (shown as squares).

Example 2

Hydrous kaolin slurry consisting of particles with greater than 70% having an equivalent spherical diameter less than 2 μm as measured by Sedigraph 5200 and less than 0.5% particles captured on a 325 mesh screen was utilized. The hydrous kaolin in the amount of 46 to 52 dry wt. % was mixed with calcined kaolin in the amount of 48 to 54 dry wt. % to produce six inventive samples, each of which had a total slurry solids level of ~50% by weight.

The calcined kaolin components for both the Inventive and Comparative samples were formed from the same hydrous kaolin slurry source. However, for the Inventive samples, a 37.0 wt % ammonium polyphosphate solution was added at 0.15 dry wt % as available phosphate to the hydrous kaolin slurry prior to calcination. For the Comparative samples the calcined kaolin was not pre-treated with phosphate. The physical properties of note related to the hydrous and calcined kaolin components are detailed in Table 1 of Example 1 and Table 7 below.

The incorporated calcined kaolin was consisted of material that was heated beyond the characteristic exothermic transition at ~950° C. to form spinel, mullite phase or a combination of spinel and mullite.

TABLE 7

Physical properties of calcined kaolin used in inventive and comparative sample preparations

| Material | MI | TBD (g/cc) | % +325 mesh residue | % <2 μm | % <1 μm |
|---|---|---|---|---|---|
| Calcined kaolin | 40 to 50 | 0.35 to 0.42 | 0 to 1.0 | 60 to 75 | 35 to 50 |

Superfloc C577 (cationic polyamine) was diluted to 1% solids in water, and then added into the Inventive Samples I to IV at a dosage of 1.0 dry pound of polymer per ton of dry clay using a standard air powered mixer. Sodium silicate grade number 40 (3.22 modulus or 3.22 parts $SiO_2$ per 1.0 parts of $Na_2O$) was then added as a binder to the mixture at a dosage of 4 wt. % on a $SiO_2$ basis. Alternatively, the amount of binder may vary from 0 wt. % to 20 wt. % on an $SiO_2$ basis addition of sodium silicate. The inventive slurry was then spray dried to form microspheres with an average particle size (APS) of 80 to 90 microns as measured by laser particle size analysis (Microtrac SRA 150). Other drying methods would be equally effective to reduce product moisture to below 2% by weight (as measured by OEM Labwave 9000 moisture analyzer). The resulting microspheres were calcined in a laboratory furnace at 815° C. (1500° F.) for 1 hour.

Two Comparative samples were produced from the same kaolin starting components, using the same procedure except that the cationic polyamine and the polyphosphate components were omitted. The sodium silicate binder concentration was the same for both Inventive and Comparative samples (8 wt. % on $SiO_2$ basis to kaolin). Both inventive and comparative samples were produced with different amounts of nutrient metakaolin microspheres to create final catalyst samples with varying total pore volume, in order to demonstrate the improvement in attrition observed over a range of total pore volumes.

Following microsphere formation, zeolite crystallization was performed using the following compositions for the inventive samples identified in Table 8, wherein seeds were fine alumino-silicate particles used to initiate zeolite crystallization and growth. Sodium silicate with a composition of 21.6 wt % SiO$_2$ and 11.6 wt % Na$_2$O (1.87 modulus as defined as parts SiO$_2$ to parts Na$_2$O) was recycled and generated from commercial production of microsphere. Nutrient microspheres, consisting primarily of metakaolin which are soluble in the basic crystallization environment, served as a nutrient source for continued zeolite Y growth. The seeds used to initiate zeolite crystallization are described in U.S. Pat. Nos. 4,493,902, and 4,631,262, which are incorporated herein by reference.

TABLE 8

FCC catalyst crystallization recipes for Inventive samples

|  | Inventive I | Inventive II | Inventive III | Inventive IV |
|---|---|---|---|---|
| Ammonium Polyphosphate Addition (dry wt % as available phosphate) | 0.15 | 0.15 | 0.15 | 0.15 |
| Polyamine Addition (lb./ton) | 1.0 | 1.0 | 1.0 | 1.0 |
| Seeds (g) | 60.0 | 60.0 | 60.0 | 60.0 |
| 1.87 modulus Sodium Silicate (g) | 595.1 | 679.6 | 407.2 | 476.9 |
| 19% Caustic (g) | 105.8 | 106.7 | 137.0 | 137.8 |
| Water (g) | 141.1 | 151.6 | 124.5 | 89.3 |
| Microspheres (g) | 190.8 | 190.8 | 190.8 | 190.8 |
| Nutrient Microspheres (g) | 9.2 | 9.2 | 9.2 | 9.2 |

TABLE 9

FCC catalyst crystallization recipes for Comparative samples

|  | Comparative I | Comparative II |
|---|---|---|
| Ammonium Polyphosphate Addition (dry wt % as available phosphate) | 0 | 0 |
| Polyamine Addition (lb./ton) | 0 | 0 |
| Seeds (g) | 60.0 | 60.0 |
| 1.87 modulus Sodium Silicate (g) | 783.8 | 783.8 |
| 19% Caustic (g) | 58.4 | 58.4 |
| Water (g) | 153.4 | 153.4 |
| Microspheres (g) | 184.5 | 184.5 |
| Nutrient Microspheres (g) | 15.5 | 15.5 |

The Y-faujasite was allowed to crystallize by mixing the calcined kaolin microspheres with the appropriate amounts of other constituents (including at least sodium silicate and water), as disclosed in U.S. Pat. No. 5,395,809, the teachings of which are herein incorporated by reference, and then heating the resulting slurry to a temperature of 200° to 215° F. for 10-24 hours, sufficient to crystallize Y-faujasite in the microspheres. The microspheres were crystallized to a desired zeolite content (typically ca. 50-65), filtered, washed, ammonium exchanged, exchanged with rare-earth cations, calcined, exchanged a second time with ammonium ions, and calcined for a second time. US Publication No. 2012/0228194 recites this procedure, and is incorporated herein by reference.

Table 10 and Table 11 list the physical properties of the resulting Inventive and Comparative samples following crystallization and the subsequent rounds of ion exchange and calcination. Total surface area (TSA), matrix surface area (MSA), and zeolite surface area (ZSA) were determined by BET analysis of nitrogen adsorption isotherms using a Micromeritics TriStar or TriStar 2 instrument. While the samples formed in this example yielded high activity/high surface area catalysts, the invention herein is not intended to be limited by the surface area or catalytic activity of the catalyst formed. This invention encompasses the improvement in attrition resistance regardless of the activity of the catalyst.

Following initial testing of the as produced catalysts, steaming was performed to simulate deactivated or equilibrium catalyst physical properties from a refinery. The process consists of steaming the catalyst at 1500° F. for 4 or more hours. Catalyst porosity was determined by the mercury porosimetry technique using a Micromeritics Autopore 4. Total pore volume is the cumulative volume of pores having diameters in the range of 30 to 10,000 Å.

TABLE 10

Catalyst physical properties for Inventive Samples

|  | Inventive I | Inventive II | Inventive III | Inventive IV |
|---|---|---|---|---|
| Total Surface Area (m$^2$/g) | 406 | 410 | 334 | 333 |
| Matrix Surface Area (m$^2$/g) | 131 | 134 | 134 | 137 |
| Zeolite Surface Area (m$^2$/g) | 275 | 276 | 200 | 196 |
| Zeolite to matrix surface area ratio | 2.10 | 2.06 | 1.49 | 1.43 |
| Steamed Total Surface Area (m$^2$/g) | 265 | 263 | NA | NA |
| Steamed Matrix Surface Area (m$^2$/g) | 91 | 92 | NA | NA |
| Steamed Zeolite Surface Area (m$^2$/g) | 174 | 171 | NA | NA |
| Steamed Zeolite to matrix surface area ratio | 1.91 | 1.86 | NA | NA |
| Total Pore Volume (cm$^3$/g) | 0.245 | 0.225 | 0.288 | 0.276 |
| Air Jet Attrition Rate (% wt. loss/hr) | 0.77 | 0.62 | 2.27 | 1.64 |

TABLE 11

Catalyst physical properties for Comparative Samples

|  | Comparative I | Comparative II |
|---|---|---|
| Total Surface Area (m$^2$/g) | 412 | 410 |
| Matrix Surface Area (m$^2$/g) | 107 | 115 |
| Zeolite Surface Area (m$^2$/g) | 305 | 295 |
| Zeolite to matrix surface area ratio | 2.9 | 2.6 |
| Steamed Total Surface Area (m$^2$/g) | 270 | 241 |
| Steamed Matrix Surface Area (m$^2$/g) | 82 | 77 |
| Steamed Zeolite Surface Area (m$^2$/g) | 188 | 164 |
| Steamed Zeolite to matrix surface area ratio | 2.3 | 2.1 |

TABLE 11-continued

Catalyst physical properties for Comparative Samples

| | Comparative I | Comparative II |
|---|---|---|
| Total Pore Volume (cm³/g) | 0.287 | 0.310 |
| Air Jet Attrition Rate (% wt. loss /hr.) | 3.97 | 4.38 |

Figure 2:
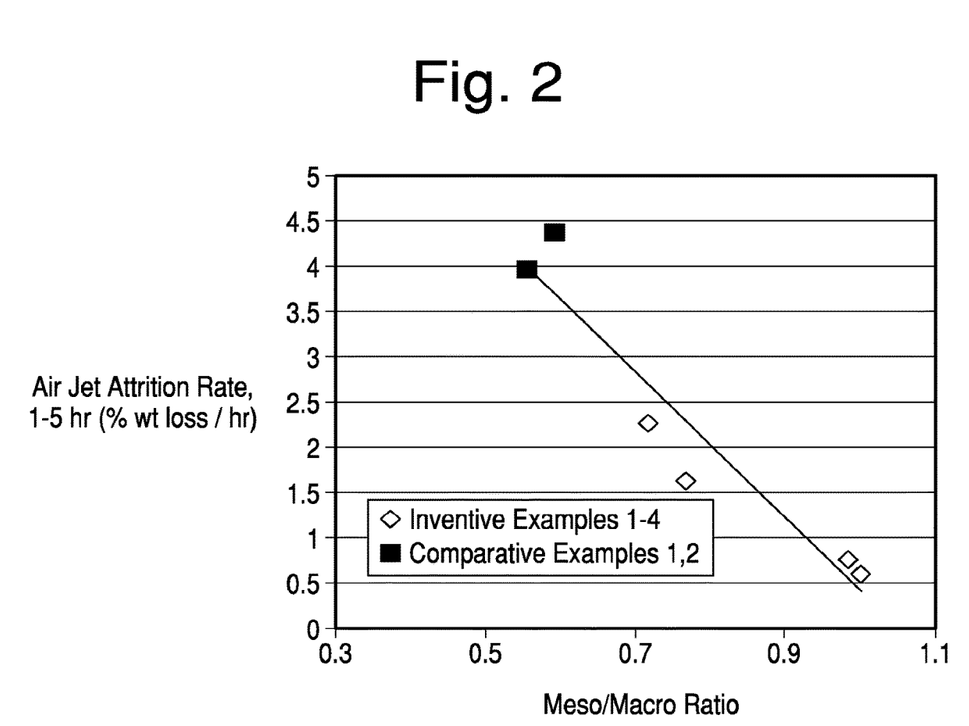
FIG. 2 is a graph comparing the meso/macro mercury pore volume versus attrition resistance of comparative catalyst samples and those formed by the present invention.

FIG. 2 is a comparison of the meso pore volume to macro pore volume versus attrition for the Comparative catalysts samples shown in squares and the Inventive catalysts formed by the process of the present invention shown in diamonds. The meso/macro ratio is described as the cumulative pore volume (cc/g) as measured by Hg Porosimetry for pores having a radius of 30-100 Å divided by the cumulative pore volume (cc/g) of pores having a radius of 100-10000 Å.

Figure 3:
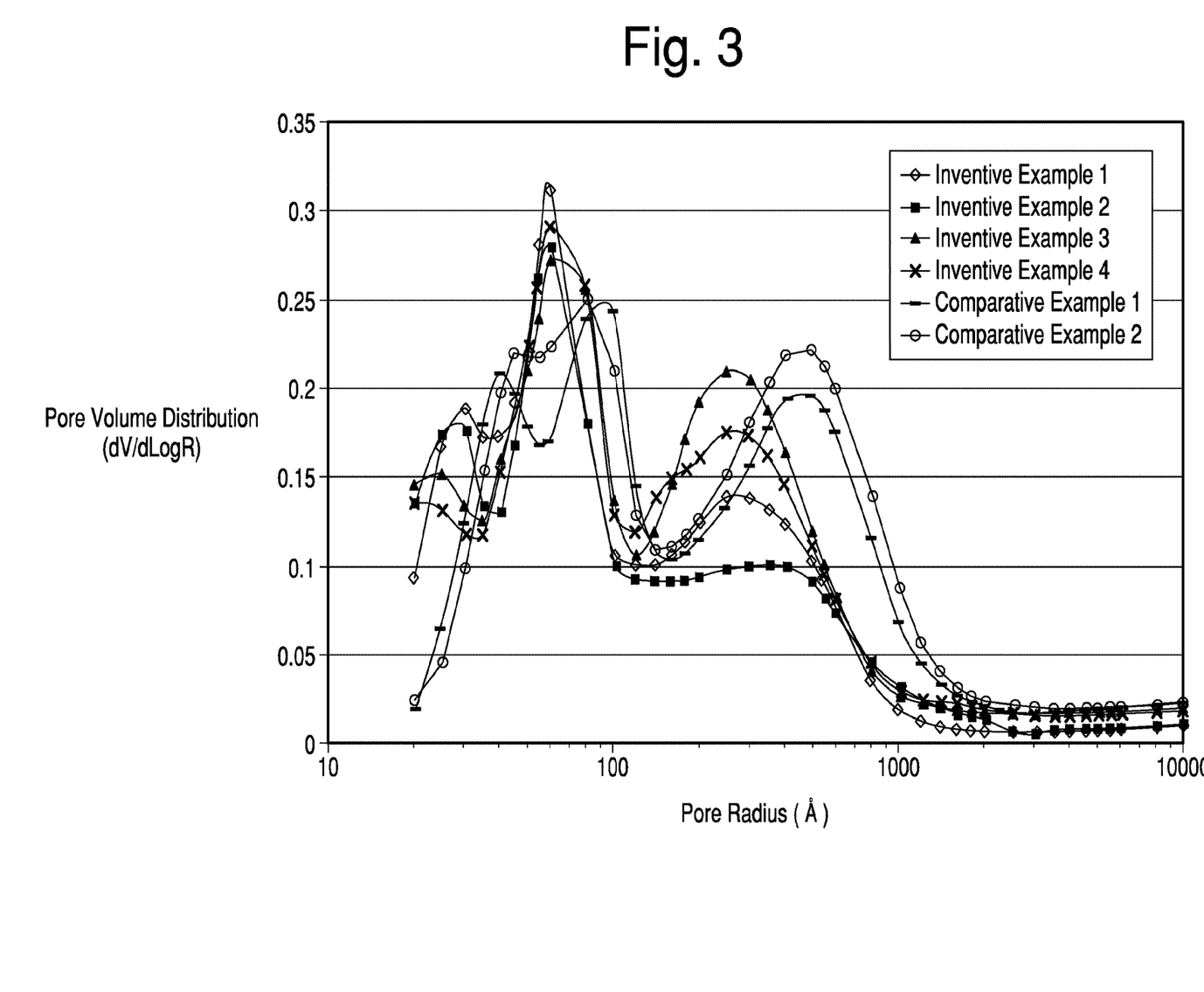
FIG. 3 is a graph showing the distribution of pore sizes within comparative catalysts, and catalysts formed by the present invention, in which the differences in catalyst formation were with respect to the amount of metakaolin contained in the microsphere used to form the catalyst.
Figure 4:
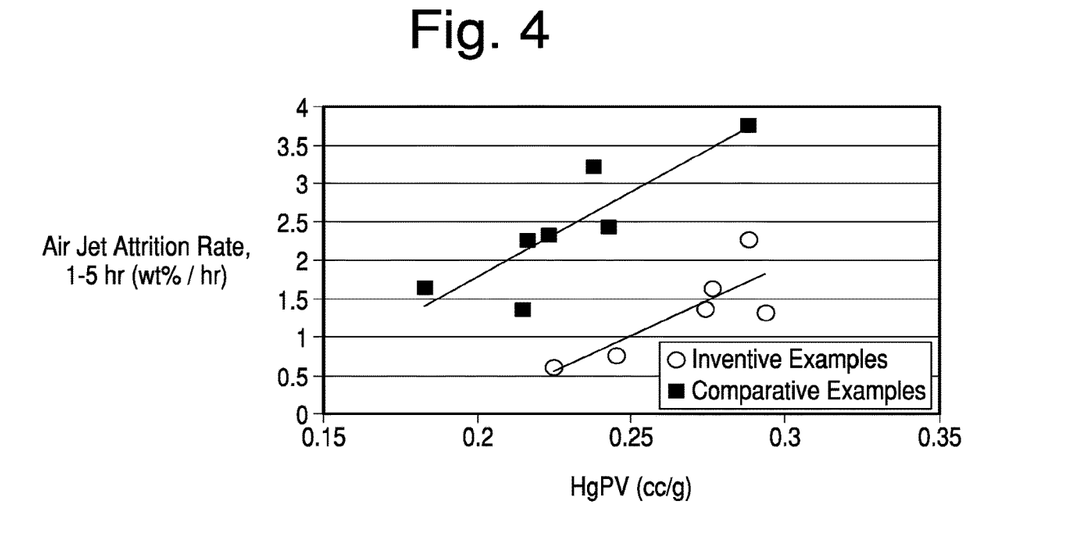
FIG. 4 is a graph comparing the attrition rate of comparative catalyst samples, and catalysts formed by the process of the present invention.

As can be seen, the catalysts formed in accordance with the present invention had a higher meso pore volume than the Comparative catalyst samples, and a substantial improvement in attrition resistance. Referring to FIG. 4, it can be seen that the improvement in attrition resistance is not a result of lower pore volume as the catalysts of the present invention had higher pore volume than the commercial catalysts. FIG. 3 illustrates the pore volume distribution of catalysts formed in accordance with the present invention, wherein Inventive Samples I through IV are shown versus Comparative Samples I through II. As noted in FIG. 2, the inventive catalysts exhibit increased mesoporosity relative to macroporosity. The pore volume distributions in FIG. 3 reflect this shift in distribution with each of the Inventive examples having increased total mesoporosity and a reduction in the pore size of the macroporosity peak. These changes in pore size are observed in each of the catalysts formed in accordance with this invention. The pore volume distribution in the macro pore region can be adjusted by other means such as modifying the metakaolin content and/or the silicate/seed content, but the pore volume distribution in the meso pore region remains essentially the same regardless of variations in the macro pore volume distribution. The benefits of the inventive technology are illustrated in the improved attrition performance of the catalysts while having sufficient total pore volume that catalytic performance is not degraded due to mass diffusion limitations. Further, it has also been found that by varying the polyamine to ammonium polyphosphate ratio, the pore radius peaks in the meso and macro pore regions can be shifted offering additional flexibility in catalyst physical properties that impact attrition and catalytic performance parameters.

Example 3

FIG. 4 compares the air jet attrition rates of Comparative FCC catalysts plotted as squares, including a commercial catalyst prepared in accordance with the teachings of U.S. Pat. No. 6,943,132, versus the Inventive samples noted by the data plotted as dots. The Comparative and Inventive samples demonstrated were prepared according to the procedures outlined in Example 2, but are not of the samples as described in Example 2. Specifically, in FIG. 4, for Inventive Samples, ammonium polyphosphate was added at a dosage of 0.15 wt % as available phosphate to the hydrous kaolin slurry prior to forming the calcined kaolin used in the subsequent blending step. Polyamine was added to the blend of hydrous and calcined kaolin at a dosage of 1 lb./ton. In each Inventive example, the amount of polyamine treated kaolin in the microsphere equaled 48 to 52 wt. % and the polyphosphate treated kaolin equaled 52 to 48 wt. % of the total kaolin content of the microsphere. As shown in FIG. 4, the Inventive catalyst has greater total mercury pore volume than the comparative catalyst, and yet, the attrition resistance is significantly improved relative to the commercial catalyst and is maintained at a higher pore volume relative to the polyphosphate only treated catalyst. Further, comparing FIG. 4 to FIG. 1, it can be seen that the catalyst treated with only polyamine yielded less improvements attrition resistance versus the combined treatment in the present invention.

The invention claimed is:

1. A method for producing mesoporous catalyst particles, the method comprising:
    heating an ammonium polyphosphate-modified kaolin beyond the characteristic exotherm to obtain calcined kaolin;
    preparing an aqueous slurry comprising the calcined kaolin and a cationic polyamine-modified kaolin, wherein a polyamine content of the slurry is present from 0.005 wt. % to 0.250 wt. % based on a total weight of kaolin solids present and is sufficient to promote particle flocculation;
    spray drying the aqueous slurry to obtain particles;
    calcining the particles; and
    contacting the particles after the calcining with a silicate solution in the presence of a zeolite crystallization initiator to induce zeolite crystallization and produce the mesoporous catalyst particles,
    wherein the mesoporous catalyst particles have an average particle size of from 20 to 200 microns, wherein the mesoporous catalyst particles exhibit a meso/macro ratio defined as the cumulative pore volume for pores having a radius of 30 Å to 100 Å divided by the cumulative pore volume for pores having a radius of 100 Å to 10000 Å, pore volume measured by mercury porosimetry, wherein the meso/macro ratio is from 0.65 to 1.2.

2. The method of claim 1, wherein the mesoporous catalyst particles are characterized by an air jet attrition rate of from 0.5 to less than 2.5.

3. The method of claim 1, wherein the air jet attrition rate is from at least 0.5 to less than 1.5.

4. The method of claim 1, wherein the slurry comprises from 30 wt. % to 70 wt. % of the calcined kaolin and from 30 wt. % to 70 wt. % of the polyamine-modified kaolin, based on a total weight of kaolin solids present.

5. The method of claim 4, comprising from 40 wt. % to 52 wt. % of the calcined kaolin and from 48 wt. % to 60 wt. % of the polyamine-modified kaolin based on the total weight of kaolin solids present.

6. The method of claim 1, wherein the zeolite crystallization results in the formation of zeolite Y.

7. The method of claim 1, wherein the meso/macro ratio is from 0.675 to 1.1.

8. The method of claim 1, further comprising:
    preparing an initial aqueous slurry comprising hydrous kaolin and a polyphosphate; and
    spray drying the initial slurry to obtain polyphosphate-treated kaolin particles.

9. The method of claim 8, further comprising:
    pulverizing the polyphosphate-treated kaolin to produce the polyphosphate-treated kaolin.

10. The method of claim 9, further comprising:
ion exchanging the mesoporous catalyst particles to replace a substantial portion of sodium ions of the mesoporous catalyst particles with ammonium or rare earth ions.

* * * * *